United States Patent
Arimura

(10) Patent No.: US 7,674,548 B2
(45) Date of Patent: Mar. 9, 2010

(54) FUEL CELL

(75) Inventor: Tomoaki Arimura, Ome (JP)

(73) Assignee: Kabuhsiki Kaisha Toshiba, Tokyo (JP)

(*) Notice: Subject to any disclaimer, the term of this patent is extended or adjusted under 35 U.S.C. 154(b) by 1142 days.

(21) Appl. No.: 11/284,484

(22) Filed: Nov. 22, 2005

(65) Prior Publication Data

US 2006/0115704 A1    Jun. 1, 2006

(30) Foreign Application Priority Data

Nov. 30, 2004   (JP) ............................. 2004-347315

(51) Int. Cl.
    *H01M 2/02* (2006.01)
(52) U.S. Cl. ............................... 429/34; 429/35; 429/30
(58) Field of Classification Search ................. 429/34, 429/35, 30
    See application file for complete search history.

(56) References Cited

U.S. PATENT DOCUMENTS

2003/0049367 A1   3/2003   Biegert et al.

FOREIGN PATENT DOCUMENTS

| JP | 07-135007 | 5/1995 |
| JP | 2004-039341 | 2/2004 |

*Primary Examiner*—Laura S Weiner
(74) *Attorney, Agent, or Firm*—Blakely, Sokoloff, Taylor & Zafman LLP

(57) ABSTRACT

A fuel cell comprises a single cell including a membrane assembly electrode unit comprising a fuel electrode to which an aqueous methanol solution is supplied as a fuel, an air electrode to which an oxidizing gas is supplied, and an electrolyte membrane interposed between the electrodes, a fuel separator and an oxidizing gas separator disposed at both sides of the membrane assembly electrode unit, and seal members respectively disposed between the membrane assembly electrode unit and the fuel separator and between the membrane assembly electrode unit and the oxidizing gas separator. The seal member includes a specific copolymer of a monomer containing a metal element.

12 Claims, 4 Drawing Sheets

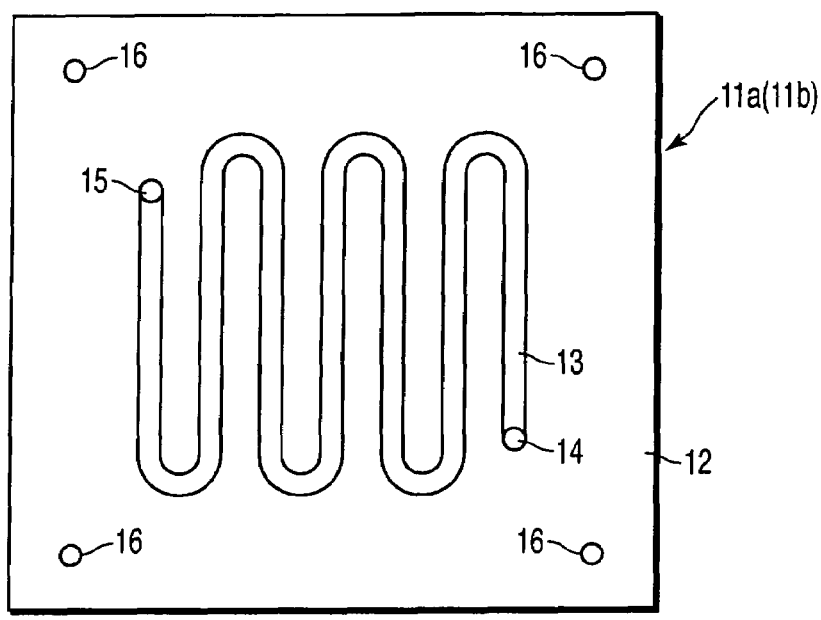
F I G. 3
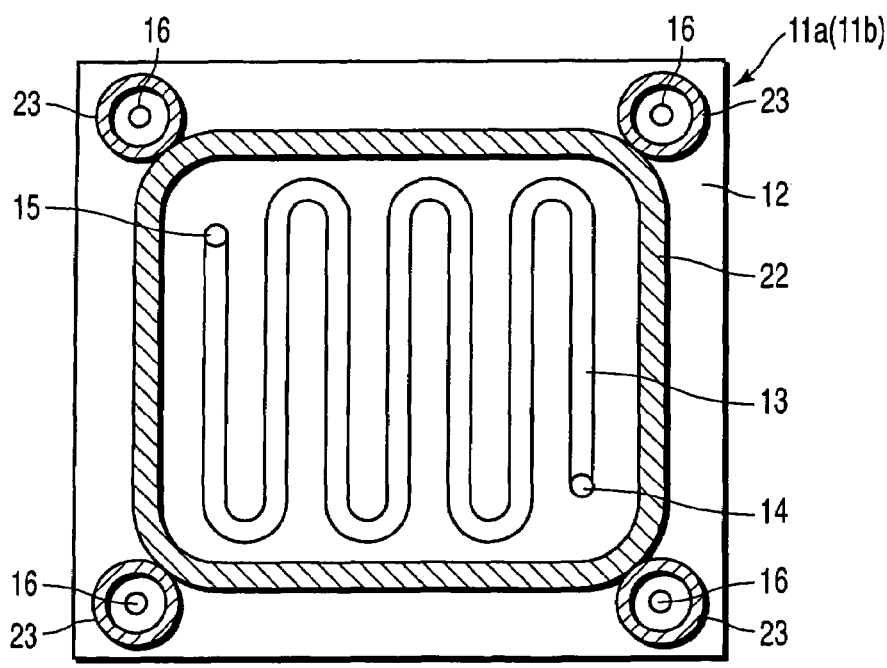
F I G. 4
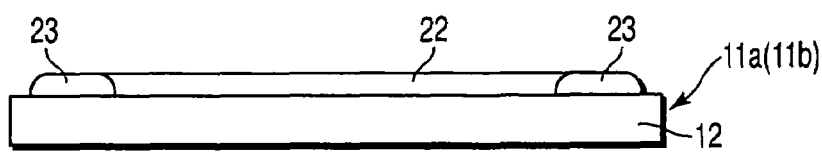
F I G. 5 ial Art

A fuel cell, for example, a direct methanol fuel cell
FUEL CELL

CROSS-REFERENCE TO THE RELATED APPLICATIONS

This application is based upon and claims the benefit of priority from the prior Japanese Patent Application No. 2004-347315, filed Nov. 30, 2004, the entire contents of which are incorporated herein by reference.

BACKGROUND

1. Field

The present invention relates to a fuel cell, and more particularly to a fuel cell with an improved seal member.

2. Description of the Related Art

A fuel cell, for example, a direct methanol fuel cell (DMFC) of the active type has a structure provided with a single cell comprising: a membrane assembly electrode unit including a fuel electrode to which an aqueous methanol solution is supplied as a fuel, an air electrode to which an oxidizing gas is supplied, and an electrolyte membrane interposed between the electrodes; a fuel separator and an oxidizing gas separator disposed at both sides of the membrane assembly electrode unit; and seal members respectively disposed between the membrane assembly electrode unit and the fuel separator and between the membrane assembly electrode unit and the oxidizing gas separator.

The seal member to be assembled in the single cell is required to have the following properties in order to fulfill its functions.

(1) High resistance to the aqueous methanol solution supplied to the fuel electrode.

(2) Excellent impermeability to the oxidizing gas (for example, air) supplied to the air electrode.

(3) High resistance to radical seeds generated by an electrode reaction or radical seeds generated by an electric field in a battery.

Jpn. Pat. Appln. KOKAI Publication No. 2004-39341 discloses that the seal member (gasket) is composed of a rubber material such as silicone rubber.

Such a seal member made of rubber has an excellent impermeability to the oxidizing gas mentioned in (2). However, the seal member expands, shrinks and deteriorates in the presence of the aqueous methanol solution. The seal member also deteriorates due to the effects of radical seeds generated by the electrode reaction or radical seeds generated by the electric field in the battery. As a result, the original elasticity of rubber for composing the seal member is lowered, and the sealing performance of the membrane assembly electrode unit and passage plates is lowered. A decline in the sealing performance leads to leakage of a fuel and oxidizing gas, or disintegration of the stack structure of the single cell, thereby lowering the output or lowering the long-range reliability of the fuel cell.

BRIEF DESCRIPTION OF THE SEVERAL VIEWS OF THE DRAWING

FIG. 3 is a plan view showing a fuel separator and an oxidizing gas separator assembled in the single cell in FIG. 1;

FIG. 4 is a plan view showing a fuel separator and an oxidizing gas separator assembled in a single cell of a fuel cell according to another embodiment of the invention;

FIG. 5 is a front view of FIG. 4;

DETAILED DESCRIPTION OF THE INVENTION

A fuel cell according to one embodiment of the invention will be specifically described below with reference to the accompanying drawings.

A fuel cell of this embodiment has a structure provided with a single cell comprising: a membrane assembly electrode unit including a fuel electrode to which an aqueous methanol solution is supplied as a fuel, an air electrode to which an oxidizing gas is supplied, and an electrolyte membrane interposed between the electrodes; a fuel separator and an oxidizing gas separator disposed at both sides of the membrane assembly electrode unit; and a seal member disposed between the membrane assembly electrode unit and the fuel separator and between the membrane assembly electrode unit and the oxidizing gas separator.

Figure 1:
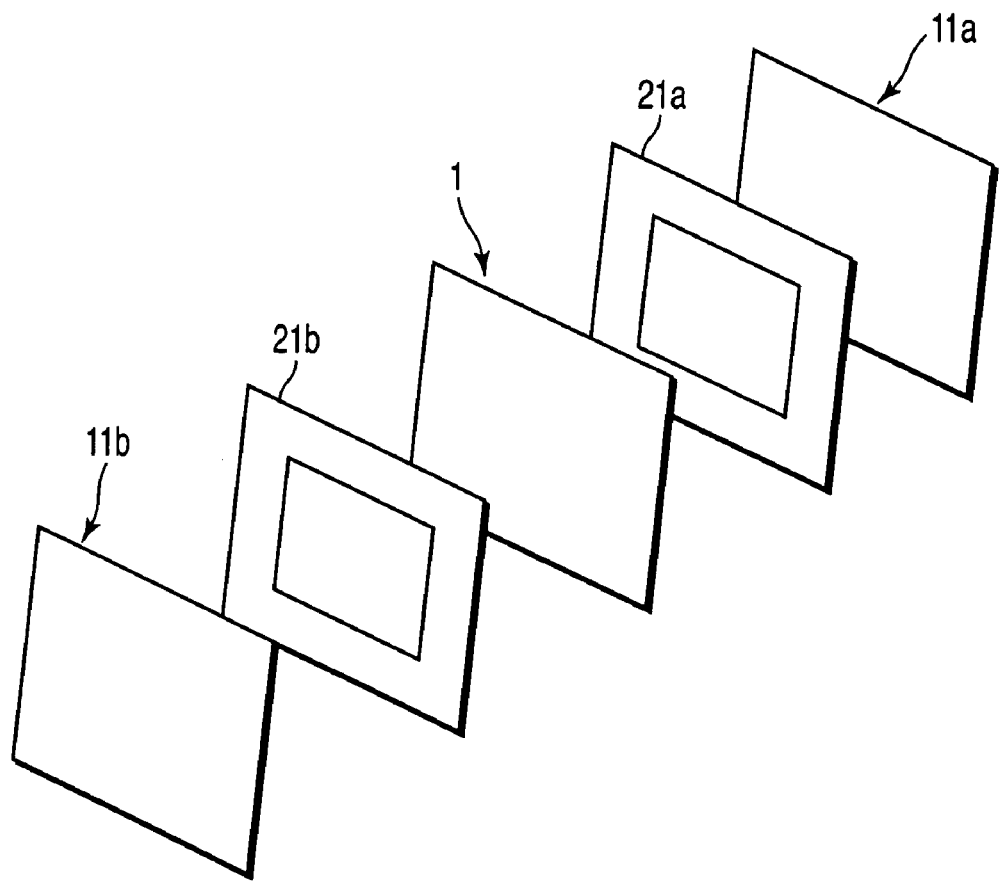
FIG. 1 is a schematic perspective view showing a single cell of a fuel cell according to one embodiment of the invention.
Figure 2:
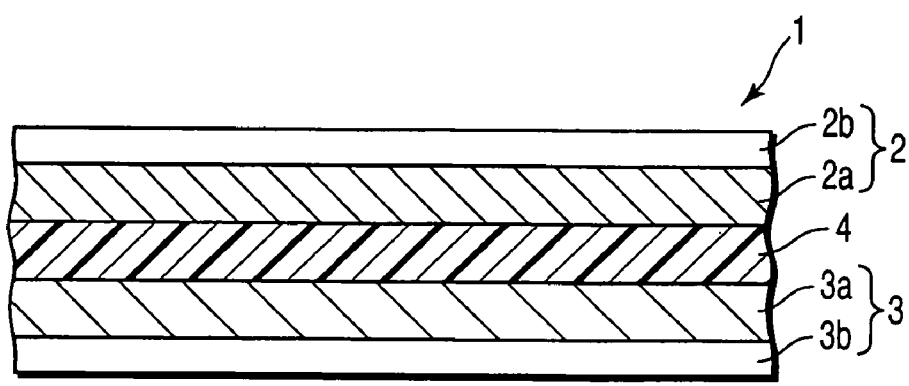
FIG. 2 is a sectional view showing a membrane assembly electrode unit assembled in the single cell in FIG. 1.

Specifically, the single cell has a structure as shown in FIGS. 1 to 3. FIG. 1 is a schematic perspective view showing a single cell of a fuel cell according to the embodiment of the invention, FIG. 2 is a sectional view showing a membrane assembly electrode unit assembled in the single cell in FIG. 1, and FIG. 3 is a plan view showing a fuel separator and an oxidizing gas separator assembled in the single cell in FIG. 1.

In the figure, reference numeral 1 is a membrane assembly electrode unit. The membrane assembly electrode unit 1 includes, as shown in FIG. 2, a fuel electrode 2 to which an aqueous methanol solution is supplied as a fuel, an air electrode 3 to which an oxidizing gas is supplied, and an electrolyte membrane 4 interposed between these electrodes 2 and 3. The fuel electrode 2 is composed of a catalyst layer 2a which contacts with the electrolyte membrane 4, and a diffusion layer 2b having a carbon paper laminated on the catalyst layer 2a. The air electrode 3 is composed of a catalyst layer 3a which contacts with the electrolyte membrane 4, and a diffusion layer 3b having a carbon paper laminated on the catalyst layer 3a.

A fuel separator 11a is disposed at the side of the fuel electrode 2 of the membrane assembly electrode unit 1 by way of, for example, a frame-shaped seal member 21a. An oxidizing gas separator 11b is disposed at the side of the air electrode 3 of the membrane assembly electrode unit 1 by way of, for example, a frame-shaped seal member 21b. The separators 11a and 11b each comprise, as shown in FIG. 3, a separator main body 12 made of, for example, carbon, a grooved passage 13 for fuel (or oxidizing gas) formed so as to meander in a portion opposite to the inside of the frame of the frame-shaped seal members 21, 22 of the passage main body 12, a feed port 14 for fuel (or oxidizing gas) formed so as to penetrate in the main body 12 at one end of the passage 13, and a discharge port 15 for fuel (or oxidizing gas) formed so as to penetrate in the main body 12 at the other end of the passage 13. At four corners of the separator main body 12, holes 16 are opened through which bolts for assembling a single cell are inserted. In addition, a current collector (not shown) is disposed in the fuel separator 11a and the oxidizing gas separator 11b.

The single cell of the fuel cell is not limited to the structure shown in FIGS. 1 to 3, in which the frame-shaped seal members 21a, 21b are interposed between the membrane assembly electrode unit 1 and the fuel separator 11a and between the membrane assembly electrode unit 1 and the oxidizing gas separator 11b. For example, a module structure may be composed as shown in FIGS. 4 and 5, in which the seal members are integrated with separator plates. That is, the frame-shaped seal member 22 is provided such that the fuel separator 11a and the oxidizing gas separator 11b surround the passage 13 on the separator main body 12 at the membrane assembly electrode unit side. A ring-shaped seal member 23 is provided to surround each of the holes 16 positioned on the outside of the frame-shaped seal member 22.

The seal member assembled in the single cell is composed of a copolymer of a monomer containing a metal element represented by the following formula (I):

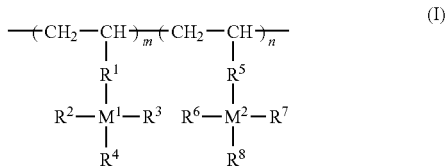

where $R^1$ denotes an aromatic functional group; $R^2$, $R^3$, $R^6$ and $R^7$ each denote an aliphatic functional group or a halogen group, which are the same or different; $R^4$ denotes an aliphatic functional group, $R^5$ denotes an aromatic functional group; $R^8$ denotes an aromatic function group; $M^1$ and $M^2$ are metal elements, which are the same or different; and m and n are integers of 1 or more.

In the formula (I), $M^1$ and $M^2$ are, for example, Si, Mg, Ti, and particularly Si is preferred.

In the formula (I), m and n are preferably integers of 5 to 5000.

The seal member is preferred to be composed particularly of a copolymer of a monomer containing a metal element represented by the following formula (II):

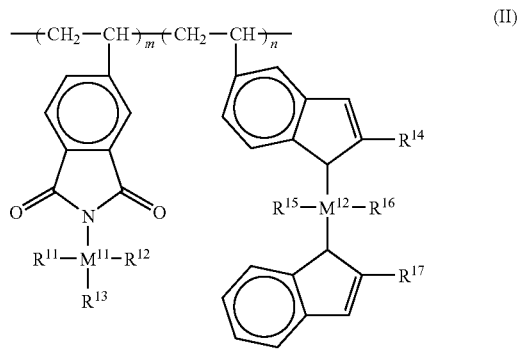

where $R^{11}$, $R^{12}$, $R^{15}$, $R^{16}$ each denote an alkyl group, an alkoxy group, an ether group, or a halogen group, which are the same or different; $R^{13}$ denotes an alkyl group, an alkoxy group, or an ether group; $R^{14}$ denotes a hydrogen, an alkyl group, an alkoxy group, an ether group, or a halogen group; $R^{17}$ denotes a hydrogen, an alkyl group, an alkoxy group, an ether group, or a halogen group; $M^{11}$ and $M^{12}$ are metal elements, which are the same or different; and m and n are integers of 1 or more.

The alkyl group and alkoxy group of $R^{11}$, $R^{12}$, $R^{15}$, $R^{16}$ and $R^{14}$ to $R^{17}$ in the formula (II) are preferred to have 1 to 20 carbon atoms.

Examples of the halogen group of $R^{11}$, $R^{12}$, $R^{15}$, $R^{16}$ and $R^{14}$ to $R^{17}$ include fluorine, chlorine, bromine, and iodine, and particularly, chlorine is preferred.

In the copolymer of a monomer containing a metal element represented by the formula (II), $R^{11}$, $R^{12}$ and $R^{13}$ are selected from an alkyl group, an alkoxy group, and an ether group, and all in the same group, and $R^{14}$ to $R^{17}$ are selected from an alkyl group, an alkoxy group, an ether group, and a halogen group, and all in the same group.

$M^{11}$ and $M^{12}$ in the formula (II) are, for example, Si, Mg, Ti, and particularly, Si is preferred.

m and n in formula (II) are integers of 5 to 5000, more preferably 15 to 2200.

The seal member assembled in the single cell of the fuel cell according to the embodiment explained above is composed of the copolymer of a monomer containing a metal element represented by the formula (I), and is hence capable of suppressing expansion and shrinkage in the presence of an aqueous methanol solution used as a fuel, and preventing deterioration due to the aqueous methanol solution. The seal member has a high resistance to radical seeds generated by an electrode reaction during cell operation, or radical seeds generated by an electric field in a battery. Further, the seal member has an excellent impermeability against an oxidizing gas (for example, air) supplied to the air electrode.

As a result, due to the seal member, the high sealing performance between the membrane assembly electrode unit and the fuel separator, and between the membrane assembly electrode unit and the oxidizing gas separator can be realized for a long period of time. Accordingly, the embodiment provides a fuel cell having an excellent long-term reliability by preventing leak of a fuel and oxidizing gas and disintegration of a stack structure of a single cell, and maintaining a high output characteristic during operation for a long period.

In particular, the seal member composed of the copolymer of a monomer containing a metal element represented by the formula (II) has a higher resistance to the aqueous methanol solution and the radical seeds, and a more excellent impermeability against an oxidizing gas (for example, air), and further has an excellent resistance to thermal decomposition and dimensional instability. As a result, the high sealing performance between the membrane assembly electrode unit and the fuel separator, and between the membrane assembly electrode unit and the oxidizing gas separator can be realized for a long period of time. Accordingly, the embodiment provides a fuel cell having an excellent long-term reliability by maintaining a high output characteristic during operation for a long period.

Examples of the invention will be specifically described below.

SYNTHESIS EXAMPLE 1

A Dimroth condenser, an oil bath, a magnetic stirrer, a stirrer, and a nitrogen balloon were installed in a 100-mL two-neck flask (a reaction container). In the reaction container, 0.5 g (molecular weight 287; $1.74 \times 10^{-3}$ mol) of vinyl-N-(t-butyl dimethyl silyl)phthalimide, 0.35 g (molecular weight 342; $1.0 \times 10^{-3}$ mol) of vinyl dimethyl bis(2-methyl-1H-indene-1-yl)silane, 0.05 g (molecular weight 242; $2.0 \times 10^{-4}$ mol) of benzoyl peroxide, and 40 mL of tetrahydrofuran were poured. The stirrer in the reaction container was rotated at an agitation speed of 200 rpm by the magnetic stirrer, and the oil bath temperature was set at 50° C. When elevation of viscosity of a reaction solution was observed, the reaction container temperature was confirmed to be cooled to 40° C. or less, and the content of the reaction container was put in 100 mL of acetone to form a sediment.

The produced sediment was transferred into two centrifugal settling tubes of 100 mL, and centrifuged for 10 minutes at 300 rpm. Discarding the supernatant, another 50 mL of acetone was added, and centrifugal separation was repeated three times. After centrifugal separation by using 50 mL of acetone, the product was dried in air and dried in vacuum to obtain a polymer.

The obtained polymer had the following structural formula (A). The structural formula (A) was identified from infrared spectral data obtained by infrared analysis: 3100 $cm^{-1}$ (aromatic C—H), 2850 cm$^{-1}$ (Si—C), 2920 cm$^{-1}$ (C—H), 1653 cm$^{-1}$ (C=C), 1620 cm$^{-1}$ (N—C=O).

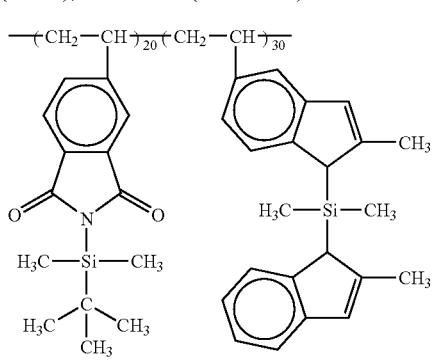

(A)

SYNTHESIS EXAMPLE 2

A polymer was synthesized in the same manner as in Synthesis example 1 except that 0.6 g (molecular weight 294; 2.0×10$^{-3}$ mol) of vinyl-N-(methoxy dimethoxy silyl)phthalimide was used instead of vinyl-N-(t-butyl dimethyl silyl)phthalimide, and that 0.9 g (molecular weight 407; 2.2×10$^{-3}$ mol) of vinyl dimethoxy bis(2-methoxy-1H-indene-1-yl)silane was used instead of vinyl dimethyl bis(2-methyl-1H-indene-1-yl)silane.

The obtained polymer had the following structural formula (B). The structural formula (B) was identified from infrared spectral data obtained by infrared analysis: 3100 cm$^{-1}$ (aromatic C—H), 2820 cm$^{-1}$ (Si—C), 2940 cm$^{-1}$ (C—H), 1645 cm$^{-1}$ (C=C), 1950 cm$^{-1}$ (N—C=O), 1150 cm$^{-1}$, 1190 cm$^{-1}$, 1020 cm$^{-1}$ (C—O—C).

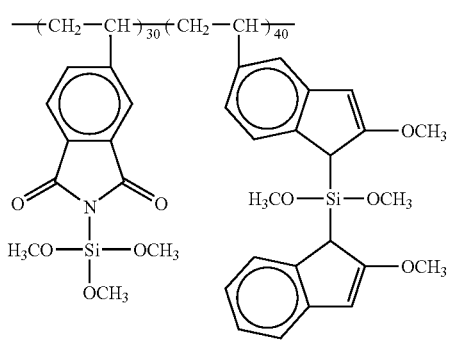

(B)

SYNTHESIS EXAMPLE 3

A polymer was synthesized in the same manner as in Synthesis example 1 except that 0.6 g (molecular weight 299; 2.0×10$^{-3}$ mol) of vinyl-N-(ethyl diethyl silyl)phthalimide was used instead of vinyl-N-(t-butyl dimethyl silyl)phthalimide, and that 0.8 g (molecular weight 342; 2.3×10$^{-3}$ mol) of vinyl diethyl bis(2-ethyl-1H-indene-1-yl)silane was used instead of vinyl dimethyl bis(2-methyl-1H-indene-1-yl)silane.

The obtained polymer had the following structural formula (C). The structural formula (C) was identified from infrared spectral data obtained by infrared analysis: 3070 cm$^{-1}$, 3030 cm$^{-1}$ (aromatic C—H), 2850 cm$^{-1}$ (Si—C), 2920 cm$^{-1}$, 2970 cm$^{-1}$ (C—H), 1660 cm$^{-1}$ (C=C), 1640 cm$^{-1}$ (N—C=O).

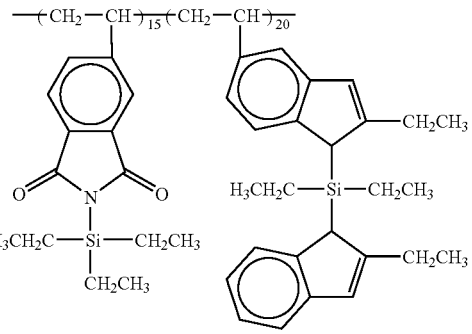

(C)

SYNTHESIS EXAMPLE 4

A polymer was synthesized in the same manner as in Synthesis example 1 except that 0.6 g (molecular weight 360; 1.6×10$^{-3}$ mol) of vinyl-N-(trimethoxy ethoxy methylethyl silyl)phthalimide was used instead of vinyl-N-(t-butyl dimethyl silyl)phthalimide, and that 0.9 g (molecular weight 638; 1.4×10$^{-3}$ mol) of vinyl dimethoxy ethoxy methyl bis(2-methoxy ethoxy methyl-1H-indene-1-yl)silane was used instead of vinyl dimethyl bis(2-methyl-1H-indene-1-yl)silane.

The obtained polymer had the following structural formula (D). The structural formula (D) was identified from infrared spectral data obtained by infrared analysis: 3100 cm$^{-1}$, 3070 cm$^{-1}$ (aromatic C—H), 2870 cm$^{-1}$ (Si—O), 3300 cm$^{-1}$, 1640 cm$^{-1}$ (N—Si), 2940 cm$^{-1}$, 2980 cm$^{-1}$ (C—H), 1630 cm$^{-1}$ (C=C), 1620 cm$^{-1}$ (N—C=O), 1160 cm$^{-1}$, 1180 cm$^{-1}$, 1040 cm$^{-1}$ (C—O—).

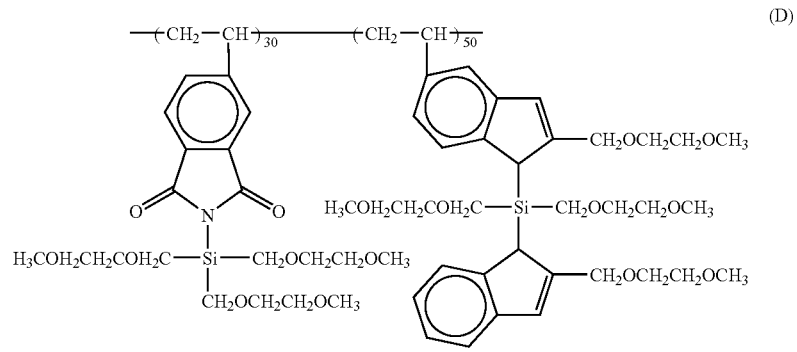

(D)

SYNTHESIS EXAMPLE 5

A polymer was synthesized in the same manner as in Synthesis example 1 except that 0.6 g (molecular weight 287; $2.0 \times 10^{-3}$ mol) of vinyl-N-(methyl dimethyl silyl)phthalimide was used instead of vinyl-N-(t-butyl dimethyl silyl) phthalimide, and that 0.9 g (molecular weight 407; $2.2 \times 10^{-3}$ mol) of vinyl dimethoxy bis(2-methyl-1H-indene-1-yl)silane was used instead of vinyl dimethyl bis(2-methyl-1H-indene-1-yl)silane.

The obtained polymer had the following structural formula (E). The structural formula (E) was identified from infrared spectral data obtained by infrared analysis: 3070 cm$^{-1}$, 3030 cm$^{-1}$ (aromatic C—H), 2870 cm$^{-1}$ (Si—O), 2920 cm$^{-1}$, 2940 cm$^{-1}$ (C—H), 1660 cm$^{-1}$ (C=C), 1640 cm$^{-1}$ (N—C=O), 1150 cm$^{-1}$, 1190 cm$^{-1}$, 1020 cm$^{-1}$ (C—O—C), 2850 cm$^{-1}$ (Si—C).

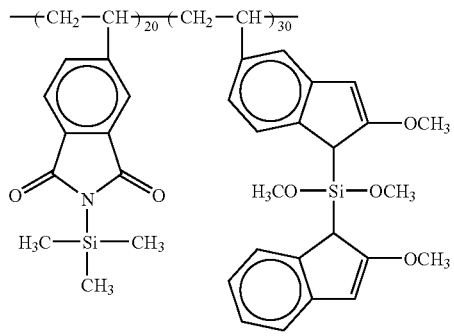

(E)

SYNTHESIS EXAMPLE 6

A polymer was synthesized in the same manner as in synthesis example 1 except that 0.8 g (molecular weight 467; $1.7 \times 10^{-3}$ mol) of vinyl-N-(trimethoxy ethoxy methyl silyl) phthalimide was used instead of vinyl-N-(t-butyl dimethyl silyl)phthalimide, and that 1.0 g (molecular weight 424; $2.3 \times 10^{-3}$ mol) of vinyl dichloro bis(2-chloro-1H-indene-1-yl)silane was used instead of vinyl dimethyl bis(2-methyl-1H-indene-1-yl)silane.

The obtained polymer had the following structural formula (F). The structural formula (F) was identified from infrared spectral data obtained by infrared analysis: 3100 cm$^{-1}$, 3070 cm$^{-1}$ (aromatic C—H), 2940 cm$^{-1}$ (Si—C), 2870 cm$^{-1}$ (Si—Cl), 3300 cm$^{-1}$, 1640 cm$^{-1}$ (N—Si), 2940 cm$^{-1}$, 2980 cm$^{-1}$ (C—H), 1630 cm$^{-1}$ (C=C), 1620 cm$^{-1}$ (N—C=O), 1160 cm$^{-1}$, 1180 cm$^{-1}$, 1040 cm$^{-1}$ (C—O—C), 1790 cm$^{-1}$, 1820 cm$^{-1}$ (C—Cl).

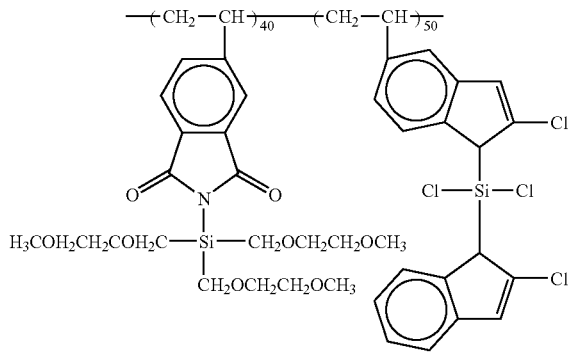

(F)

EXAMPLES 1 TO 6

The polymers obtained in Synthesis examples 1 to 6 were dissolved in 30 mL of N,N-dimethyl formamide, drawn like a glass sheet by a bar coater, dried in air, and dried in vacuum for 4 hours. Each of the obtained cast films was separated by tweezers, and air permeability, methanol permeability, radical resistance, thermal decomposition property, and dimensional stability were measured and evaluated by the following methods.

1. Air Permeability

Air permeability of a silicone rubber film of the same thickness as the cast film was measured by a gas permeability tester from GL Science, and the obtained value was taken as S0.

Also in the cast films of Examples 1 to 6, air permeabilities S1, S2, S3, S4, S5, and S6 were measured by the same method. The measured air permeabilities of the cast films were calculated as ratio relative to air permeability of the silicone rubber, that is, S1/S0, S2/S0, S3/S0, S4/S0, S5/S0, and S6/S0 were obtained. Results are shown in Table 1.

2. Methanol Permeability

Figure 6:
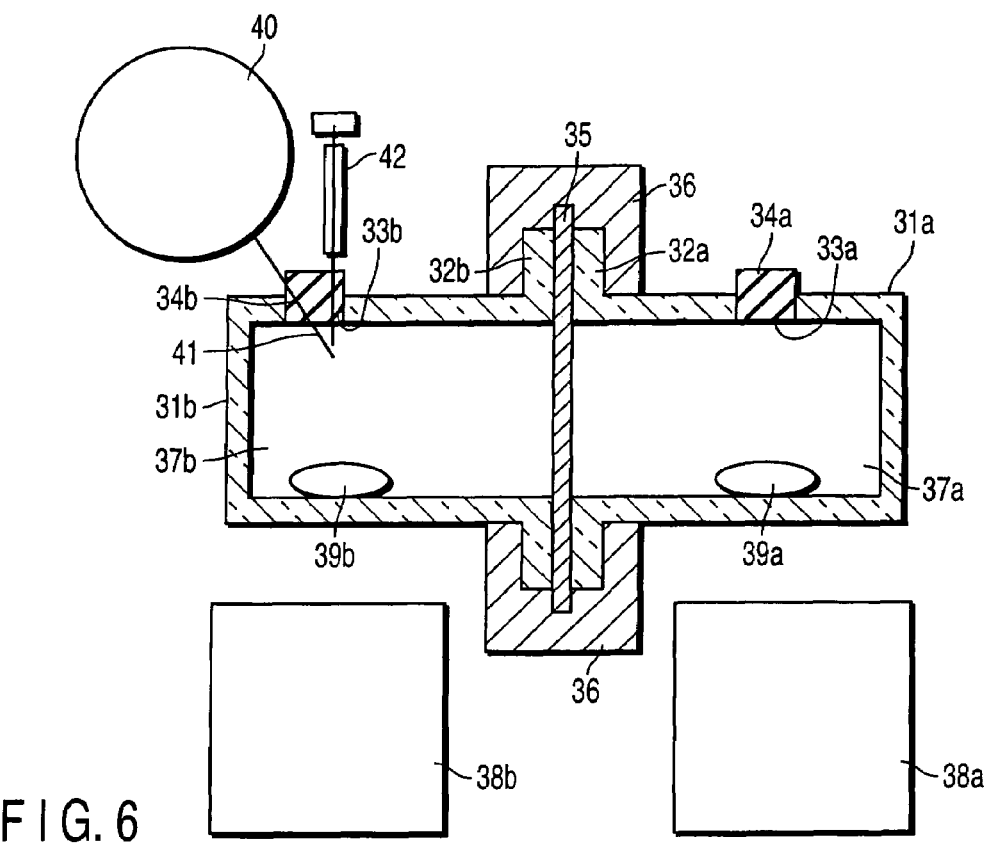
FIG. 6 is a sectional view showing a test apparatus for methanol permeability.
Figure 7:
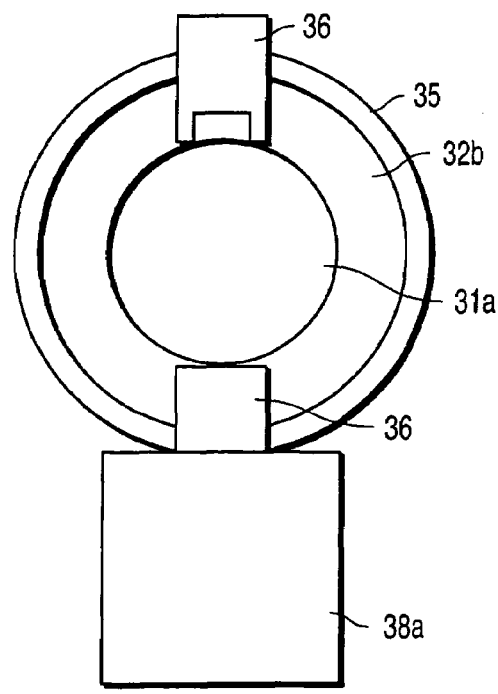
FIG. 7 is a right side view of FIG. 6.

FIG. 6 is a sectional view showing a testing apparatus for methanol permeability, and FIG. 7 is a right side view of FIG. 6.

A first sealing tube 31a made of glass of 4 cm in inside diameter and 5 cm in length having a 2-cm wide flange 32a at one end thereof is prepared. A hole 33a of 6 mm in inside diameter is opened in a side wall of the first sealing tube 31a, and a silicone rubber plug 34a is inserted in the hole 33a. As another glass-made sealing tube of the same size, a second sealing tube 31b is prepared, which has a 2-cm wide flange 32b at one end thereof, and has a hole 33b of 6 mm in inside diameter opened in the side wall, a silicone rubber plug 34b being inserted in the hole 33b. A seal member 35 made of silicone rubber conforming to type 4 of C of JIS B 2401 was inserted between the flanges 32a, 32b of the two sealing tubes 31a, 31b, and an upper part and a lower part of the flanges 32a, 32b were held and fixed by fixing clips 36. The compartment defined by the first sealing tube 31a and the seal member 35 was called a first chamber 37a, and the compartment defined by the second sealing tube 31b and the seal member 35 was called a second chamber 37b. Stirrers 39a, 39b rotated by magnetic stirrers 38a, 38b disposed beneath are contained in the first and second chambers 37a, 37b, respectively.

Removing the silicone rubber plug 34a of the first sealing tube 31a, an aqueous methanol solution of concentration of 3 wt. % was poured into the first chamber 37a through the hole 33a. By adding an appropriate amount of hydrochloric acid, the pH was adjusted to 4, and the hole 33a of the first sealing tube 31a was immediately closed by the silicone rubber plug 34a. In addition, a needle 41 of a rubber balloon 40 was pierced into the silicone rubber plug 34b of the second sealing tube 31b.

The test starting time was when the aqueous methanol solution was poured into the first chamber 37a and an appropriate amount of hydrochloric acid was added. In every 20 minutes thereafter, a microsyringe 42 was pierced into the silicone rubber plug 34b of the second sealing tube 31b, 20 microliters of gas was sampled from the second chamber 37b, and inspected by a gas chromatograph, and the methanol concentration (ppm) was measured. During measurement, the stirrers 39a, 39b in the first and second chambers 37a, 37b were rotated by the magnetic stirrers 38a, 38b, the aqueous methanol solution in the first chamber 37a was agitated, and the gas in the second chamber 37b was agitated.

Results were plotted by recording the time (minutes) on the axis of abscissas, and the methanol concentration (ppm) on the axis of ordinates, and the value obtained by dividing the methanol concentration after 100 minutes by the time was obtained as methanol diffusion speed D0 (ppm/min) of silicone rubber.

Further, the cast films of Examples 1 to 6 were tested by the same apparatus and method, and methanol diffusion speeds D1, D2, D3, D4, D5, and D6 (ppm/min) were obtained. The relative ratios of the methanol diffusion speeds of the cast films to the methanol diffusion speed D0 of silicone rubber were calculated, that is, D1/D0, D2/D0, D3/D0, D4/D0, D5/D0, and D6/D0 were obtained. Results are shown in Table 1.

3. Radical Resistance

A 100-mL beaker was fixed in an oil bath, an oxidizing aqueous solution (Phento reagent that generates OH radicals) comprising hydrogen peroxide water 3% and $FeSO_4$ 40 ppm was put in the beaker, and the oil temperature was adjusted to 60° C. A silicone rubber film was cut and weighed, and this weight was taken as W0. Subsequently, the cut sample of the silicone rubber film was put in the oxidizing aqueous solution and left at rest for 10 hours. Then, the sample was lifted, washed in water, dried in air, and dried in vacuum, and weighed, and the weight was taken as W1. From these weights W0 and W1, weight loss (WF0=W0−W1) was determined. The weight loss due to oxidizing decomposition is an index of radical resistance.

Further, the cast films of Examples 1 to 6 were similarly weighed before and after immersion in the oxidizing aqueous solution, and weight losses (WF1, WF2, WF2, WF3, WF4, WF5, WF6) were determined. The relative ratios of the measured weight losses of the cast films to the weight loss WF0 of the silicone rubber film were determined, that is, WF1/WF0, WF2/WF0, WF3/WF0, WF4/WF0, WF5/WF0, WF6/WF0 were obtained. Results are shown in Table 1.

4. Thermal Decomposition Property

From silicone rubber, 10 mg was sampled, and the thermal decomposition temperature in nitrogen gas was measured by using a TG-DTA apparatus (Thermo Plus 2 (trademark) of Rigaku). The temperature elevation speed at that time was 10° C./min. The measured oxidizing decomposition temperature of silicone rubber was taken as T0 (° C.).

From each of the cast films of Examples 1 to 6, 10 mg was sampled, and oxidizing decomposition temperatures (T1, T2, T3, T4, T5, T6) were similarly measured. The relative ratios of the measured oxidizing decomposition temperatures of the cast films to the oxidizing decomposition temperature of silicone rubber were determined, that is, T1/T0, T2/T0, T3/T0, T4/T0, T5/T0, T6/T0 were obtained. Results are shown in Table 1.

5. Dimensional Stability

A sheet of a seal member made of silicone rubber conforming to type 4 of C of JIS B 2401 was cut in width 30 mm×length 150 mm to obtain a sample. This sample was immersed in a 3% concentration aqueous methanol solution (room temperature) adjusted to pH 4 by adding chlorine. After elapse of 4 hours, the sample was pulled up, the aqueous methanol solution was wiped off, and the length was measured. The measured sample length was taken as L0.

From the cast films of Examples 1 to 6, samples were obtained by cutting in width 30 mm×length 150 mm, and the sample lengths (L1, L2, L3, L4, L5, L6) were measured similarly. The relative ratios of the measured sample lengths of the cast films to the sample length of silicone rubber were determined, that is, L1/L0, L2/L0, L3/L0, L4/L0, L5/L0, L6/L0 were obtained. Results are shown in Table 1.

TABLE 1

| | Seal member | Air permeability (relative ratio) | Methanol Permeability (relative ratio) | Radical resistance (resistance to oxidizing decomposition) (relative ratio) | Thermal decomposition property (relative ratio) | Dimensional stability (relative ratio) |
|---|---|---|---|---|---|---|
| Example 1 | Structural formula A | 0.95 | 0.92 | 0.93 | 0.95 | 0.96 |
| Example 2 | Structural formula B | 0.88 | 0.93 | 0.95 | 0.96 | 0.95 |
| Example 3 | Structural formula C | 0.92 | 0.94 | 0.96 | 0.97 | 0.94 |
| Example 4 | Structural formula D | 0.92 | 0.95 | 0.96 | 0.94 | 0.95 |
| Example 5 | Structural formula E | 0.90 | 0.94 | 0.94 | 0.95 | 0.96 |
| Example 6 | Structural formula F | 0.96 | 0.93 | 0.94 | 0.93 | 0.94 |

As is clear from Table 1, the cast films (seal members) of Examples 1 to 6 of the invention were found to have excellent characteristics, being less than 1 in relative ratio to the conventional silicone rubber film, in the aspects of air permeability, methanol permeability, radical resistance, thermal decomposition, and dimensional stability.

The following is an explanation of characteristic evaluation in the case of assembling seal members obtained by cutting the cast films of Examples 1 to 6 in a frame shape, and a frame-shaped seal member (comparative example 1) made of silicone into a fuel cell.

<Assembling of Single Cell>

At a fuel electrode side of a Nafion 112 (trademark) film of Dupont, a platinum-ruthenium electrode is disposed, and at an air electrode side, a membrane electrode (electrode area: 5 cm$^2$) obtained by thermally bonding a platinum catalyst, carbon fiber and carbon paper was disposed, and a membrane assembly electrode unit was fabricated. The catalyst carrying amount was 2.2 mg/cm$^2$ at the fuel electrode side, and 1.4 mg/cm$^2$ at the air electrode side. At both sides of the membrane assembly electrode unit, a fuel separator made of carbon having a serpentine passage and an oxidizing gas separator made of carbon were disposed by way of the seal members of Examples 1 to 6 and comparative example 1, current collectors were further disposed in the passage plates, and seven single cells for evaluation shown in FIG. 1 were prepared by tightening bolts.

The obtained single cells were installed in a fuel cell evaluation apparatus. Subsequently, an aqueous methanol solution (fuel) at a concentration of 3% wt. % was passed to the fuel electrode at a flow velocity of 2.0 mL/min through the fuel separators of the single cells, and air was supplied to the air electrode side at flow velocity of 15 mL/min through the oxidizing gas separators of the single cells. A current-voltage curve of each single cell at a temperature of 60° C. was inspected. Results are shown in FIG. 8.

Figure 8:
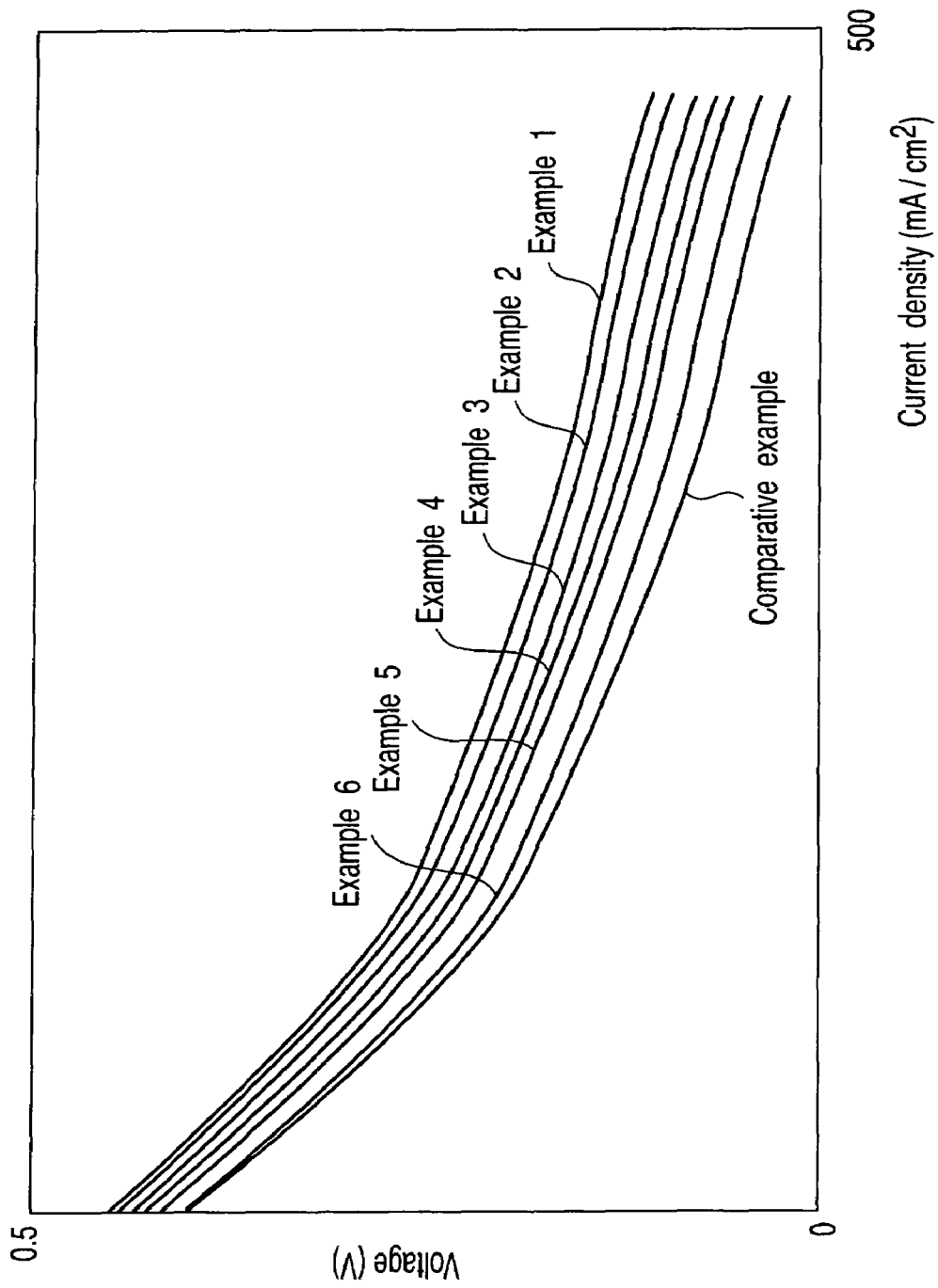
FIG. 8 is a view showing a voltage-current curve at a temperature of 70° C. of single cells having seal members assembled therein according to Examples 1 to 6 and Comparative example 1.

As is clear from FIG. 8, single cells having the seal members of Examples 1 to 6 assembled therein were found to maintain a high output characteristic for a long period as compared with the single cell having the seal member of silicone rubber of Comparative example 1 assembled therein.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the applied claims and their equivalents.

What is claimed is:

1. A fuel cell comprising a single cell including:
   a membrane assembly electrode unit comprising a fuel electrode to which an aqueous methanol solution is supplied as a fuel, an air electrode to which an oxidizing gas is supplied, and an electrolyte membrane interposed between the electrodes;
   a fuel separator and an oxidizing gas separator disposed at both sides of the membrane assembly electrode unit; and
   seal members respectively disposed between the membrane assembly electrode unit and the fuel separator and between the membrane assembly electrode unit and the oxidizing gas separator, the seal member including a copolymer of a monomer containing a metal element represented by the following formula (I):

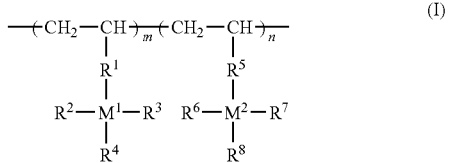

where $R^1$ denotes an aromatic functional group; $R^2$, $R^3$, $R^6$ and $R^7$ each denote an aliphatic functional group or a halogen group, which are the same or different; $R^4$ denotes an aliphatic functional group; $R^5$ denotes an aromatic functional group; $R^8$ denotes an aromatic function group; $M^1$ and $M^2$ each denote a metal element, which are the same or different; and m and n each denote an integer of 1 or more.

2. The fuel cell according to claim 1, wherein in the formula (I), $M^1$ and $M^2$ are silicon (Si), magnesium (Mg) or titanium (Ti), and values m and n are integers of 5 to 5000.

3. The fuel cell according to claim 1, wherein the copolymer of a monomer containing a metal element is represented by the following formula (II):

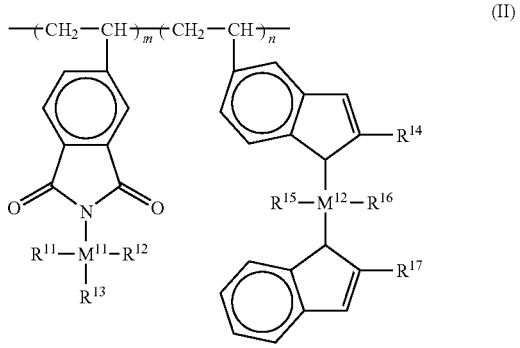

where $R^{11}$, $R^{12}$, $R^{15}$ and $R^{16}$ each denote an alkyl group, an alkoxy group, an ether group, or a halogen group, which are the same or different; $R^{13}$ denotes an alkyl group, an alkoxy group, or an ether group; $R^{14}$ denotes a hydrogen, an alkyl group, an alkoxy group, an ether group, or a halogen group; $R^{17}$ denotes a hydrogen, an alkyl group, an alkoxy group, an ether group, or a halogen group; $M^{11}$ and $M^{12}$ each denote a metal element, which are the same or different; and m and n are integers of 1 or more.

4. The fuel cell according to claim 3, wherein, in the copolymer of a monomer containing a metal element represented by the formula (II), $R^{11}$, $R^{12}$ and $R^{13}$ are selected from an alkyl group, an alkoxy group, and an ether group, and all in the same group; to $R^{14}$ to $R^{17}$ are selected from an alkyl group, an alkoxy group, an ether group, and a halogen group, and all in the same group.

5. The fuel cell according to claim 3, wherein, in the copolymer of a monomer containing a metal element represented by the formula (II), $M^1$ and $M^2$ are silicon (Si), magnesium (Mg) or titanium (Ti); and values m and n are integers of 5 to 5000.

6. The fuel cell according to claim 3, wherein in the copolymer of a monomer containing a metal element represented by the formula (II), $M^{11}$ and $M^{12}$ are both silicon (Si).

7. The fuel cell according to claim 1, wherein the fuel cell is a direct methanol fuel cell of an active type.

8. A fuel cell comprising a single cell including:
   a membrane assembly electrode unit comprising a fuel electrode to which an aqueous methanol solution is supplied as a fuel, an air electrode to which an oxidizing gas is supplied, and an electrolyte membrane interposed between the electrodes;
   a fuel separator and an oxidizing gas separator disposed at both sides of the membrane assembly electrode unit; and
   seal members respectively disposed between the membrane assembly electrode unit and the fuel separator and between the membrane assembly electrode unit and the oxidizing gas separator, the seal member including a copolymer of a monomer containing a metal element represented by the following formula (II):

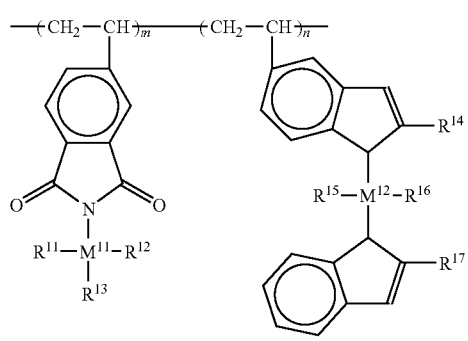

where $R^{11}$, $R^{12}$, $R^{15}$ and $R^{16}$ each denote an alkyl group, an alkoxy group, an ether group, or a halogen group, which are the same or different; $R^{13}$ denotes an alkyl group, an alkoxy group, or an ether group; $R^{14}$ denotes a hydrogen, an alkyl group, an alkoxy group, an ether group, or a halogen group; $R^{17}$ denotes a hydrogen, an alkyl group, an alkoxy group, an ether group, or a halogen group; $M^{11}$ and $M^{12}$ each denote a metal element, which are the same or different; and m and n are integers of 1 or more.

9. The fuel cell according to claim 8, wherein, in the copolymer of a monomer containing a metal element represented by the formula (II), $R^{11}$, $R^{12}$ and $R^{13}$ are selected from an alkyl group, an alkoxy group, and an ether group, and all in the same group; $R^{14}$ to $R^{17}$ are selected from an alkyl group, an alkoxy group, an ether group, and a halogen group, and all in the same group.

10. The fuel cell according to claim 8, wherein, in the copolymer of a monomer containing a metal element represented by the formula (II), $M^{11}$ and $M^{12}$ are silicon (Si), magnesium (Mg) or titanium (Ti); and values m and n are integers ranging from 5 to 5000.

11. The fuel cell according to claim 8, wherein in the copolymer of a monomer containing a metal element represented by the formula (II), $M^{11}$ and $M^{12}$ are both silicon (Si).

12. The fuel cell according to claim 8, wherein the fuel cell is a direct methanol fuel cell of an active type.

* * * * *